United States Patent
Brutchey et al.

(10) Patent No.: US 8,012,448 B2
(45) Date of Patent: Sep. 6, 2011

(54) SYNTHESIS OF METAL CHALCOGENIDE NANOCRYSTALS USING ORGANODICHALCOGENIDE REAGENTS

(75) Inventors: Richard L. Brutchey, Los Angeles, CA (US); Matthew A. Franzman, Sherman Oaks, CA (US); David H. Webber, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 12/833,859

(22) Filed: Jul. 9, 2010

(65) Prior Publication Data

US 2011/0008244 A1    Jan. 13, 2011

Related U.S. Application Data

(60) Provisional application No. 61/225,113, filed on Jul. 13, 2009.

(51) Int. Cl.
*C01B 17/00* (2006.01)
*C01B 19/00* (2006.01)
*C01B 19/04* (2006.01)

(52) U.S. Cl. ...... 423/508; 423/509; 423/511; 423/592.1; 423/624; 423/561.1; 977/773; 977/775; 977/811; 977/762

(58) Field of Classification Search ............. 423/508, 423/509, 511, 592.1, 624, 561.1; 977/773, 977/775, 811, 762
See application file for complete search history.

(56) References Cited

U.S. PATENT DOCUMENTS

| | | | |
|---|---|---|---|
| 6,225,198 B1 | 5/2001 | Alivisatos et al. | |
| 2005/0221516 A1 | 10/2005 | Pan et al. | |
| 2006/0019427 A1 | 1/2006 | Cao | |
| 2006/0110313 A1 | 5/2006 | Cho et al. | |
| 2008/0295762 A1 | 12/2008 | Mokari et al. | |
| 2008/0299033 A1 | 12/2008 | Caldwell et al. | |
| 2011/0008244 A1* | 1/2011 | Brutchey et al. ............. | 423/509 |

FOREIGN PATENT DOCUMENTS

| | | |
|---|---|---|
| CA | 2491144 A1 | 6/2005 |
| CN | 101054200 A | 10/2007 |
| JP | 2008-192542 A | 8/2008 |
| WO | 0229140 A1 | 4/2002 |
| WO | 0234757 A2 | 5/2002 |
| WO | 03050329 A2 | 6/2003 |
| WO | 2004073021 A2 | 8/2004 |
| WO | 2004108598 A1 | 12/2004 |
| WO | 2005022120 A2 | 3/2005 |
| WO | 2005106082 A1 | 11/2005 |
| WO | 2008021604 A2 | 2/2008 |

OTHER PUBLICATIONS

Calvet, W. et al. 2005. Epitaxial CuInS2 on Si(111) Using di-tert-Butyl Disulfide as Sulphur Precursor. Thin Film Solids, 480-481, pp. 347-351.
Du, W. et al. 2007. Shape- and Phase-Controlled Synthesis of Monodisperse, Single-Crystalline Ternary Chalcogenide Colloids Through a Convenient Solution Synthesis Strategy. Chemistry: A European Journal, vol. 13, pp. 8840-8846.
Franzman, M.A. et al. 2009. Solution-Phase Synthesis of Well-Defined Indium Sulfide Nanorods. Chemistry of Materials, vol. 21, pp. 1790-1792.
Franzman, M.A. et al. 2009. Peroxide-Mediated Synthesis of Indium Oxide Nanocrystals at Low Temperatures. J. Phys. Chem. C., vol. 113, pp. 630-636.
Franzman, M.A. et al. 2010. Solution-Phase Synthesis of SnSe Nanocrystals for Use in Solar Cells. Journal of the American Chemical Society, vol. 312, pp. 4060-4061.
Liu, H. et al. 2007. Mechanistic Study of Precursor Evolution in Colloidal Group II-VI Semiconductor Nanocrystal Synthesis. Journal of the American Chemical Society, vol. 129, pp. 305-312.
Norako, M.E. et al. 2009. Growth Kinetics of Monodisperse Cu-In-S Nanocrystals Using a Dialkyl Disulfide Sulfur Source. Chemistry of Materials, vol. 21, pp. 4299-4304.
Norako, M.E. et al. 2010. Synthesis of Metastable Wurtzite CuInSe2 Nanocrystals. Chemistry of Materials, vol. 22, pp. 1613-1615.
Ouchi, A. et al. 2008. Room-Temperature Reaction of Laser-Photolytically Generated Te Nanosols With Silver. Journal of Photochemistry and Photobiology A: Chemistry, vol. 200, pp. 187-191.
Schlecht, S. et al. 2002. Nanocrystalline Tin as a Preparative Tool: Synthesis of Unprotected Nanoparticles of SnTe and SnSe and a New Route to (PhSe)4Sn. Inorganic Chemistry, vol. 41, No. 23, pp. 6001-6005.
Steckel, J.S. et al. 2006. On the Mechanism of Lead Chalcogenide Nanocrystal Formation. Journal of the American Chemical Society, vol. 128, pp. 13032-13033.
Webber, D.H. et al. 2009. Photolytic Preparation of Tellurium Nanorods. Chem. Commun., pp. 5701-5703.
Zhao, L. et al. 2006. Porous Silicon and Alumina as Chemically Reactive Templates for the Synthesis of Tubes and Wires of SnSe, Sn, and SnO2. Angew. Chem. Int. Ed., vol. 45, pp. 311-315.

* cited by examiner

*Primary Examiner* — Timothy C Vanoy
(74) *Attorney, Agent, or Firm* — McDermott Will & Emery LLP

(57) ABSTRACT

A method of synthesizing metal chalcogenide nanocrystals involving the steps of combining an organodichalcogenide, a metal salt and a ligand compound to form a mixture; degassing the mixture to remove air and water from the mixture; heating the mixture at a temperature below the decomposition temperature of the organodichalcogenide for a period of time sufficient to form a metal chalcogenide nanocrystal.

15 Claims, 3 Drawing Sheets

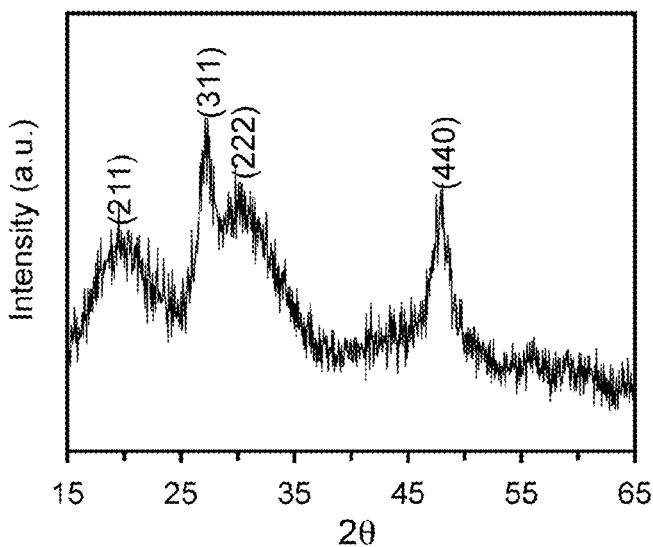
FIGURE 1
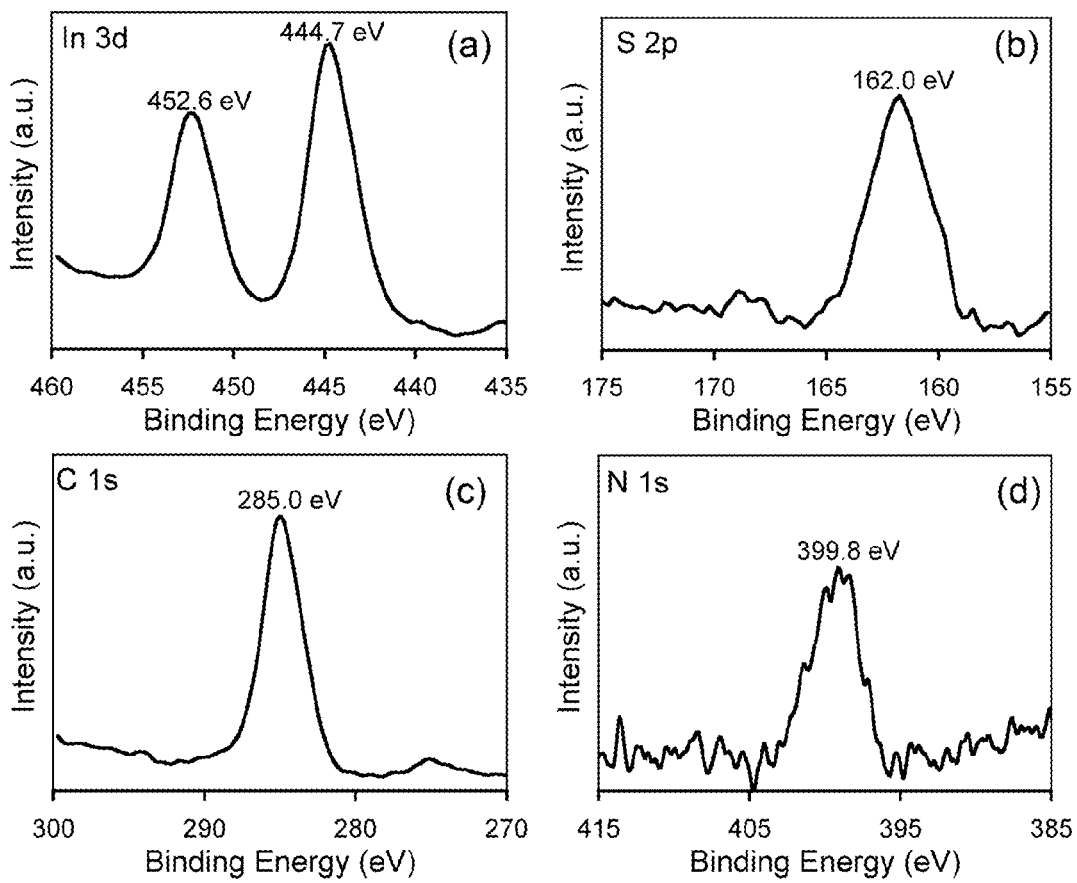
FIGURES 2(a)-(d)

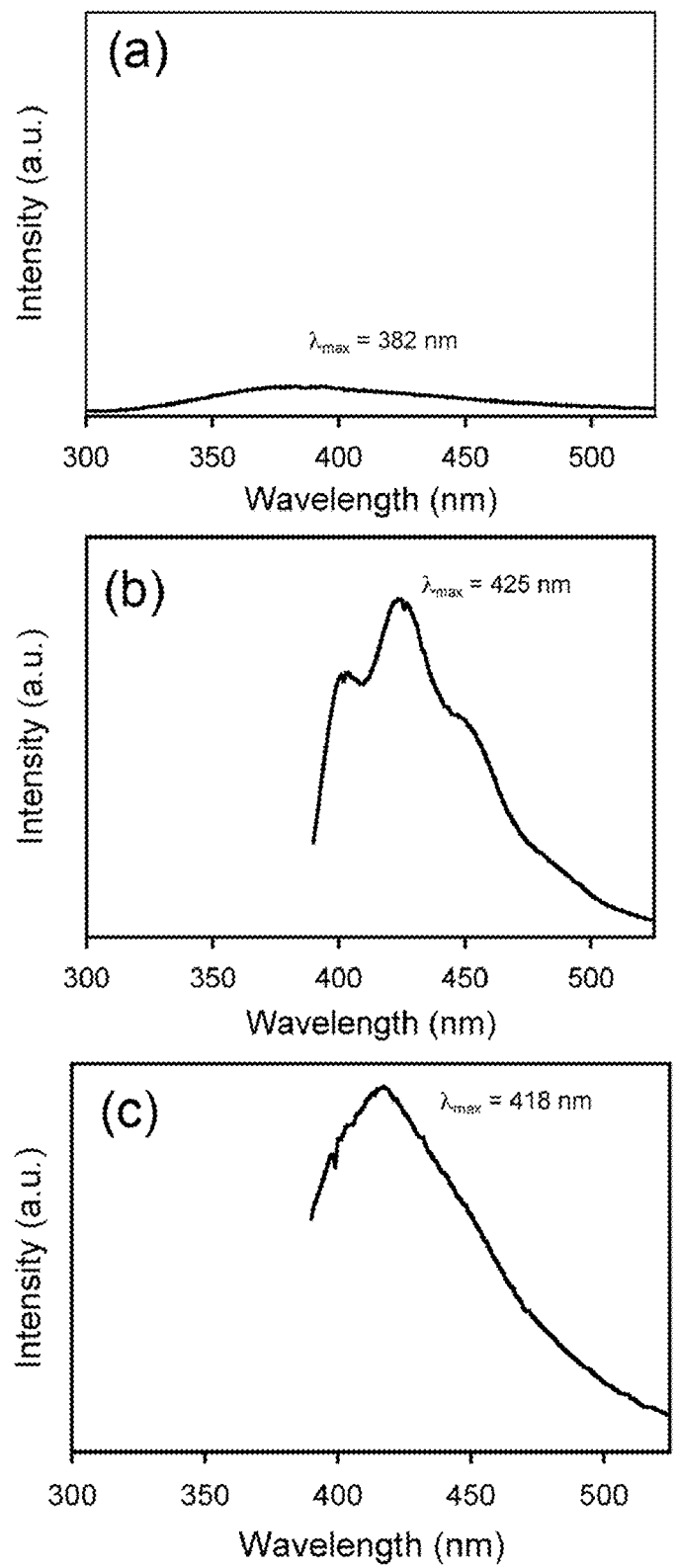
Figures 4(a)-(c)

SYNTHESIS OF METAL CHALCOGENIDE NANOCRYSTALS USING ORGANODICHALCOGENIDE REAGENTS

CROSS REFERENCE TO RELATED APPLICATION

This application is based upon and claims the benefit of priority from Provisional U.S. Patent Application 61/225,113 filed on Jul. 13, 2009, the entire contents of which are incorporated by reference herein.

BACKGROUND

1. Field of the Disclosure

This disclosure relates to synthesis of metal chalcogenide nanocrystals. Particularly, this disclosure relates to methods of synthesizing metal chalcogenide nanocrystals using organodichalcogenide reagents in which the size and shape of the nanocrystals is controlled.

2. Description of the Related Art

Nanotechnology has the potential to revolutionize medicine, electronics, and energy conversion; however, the development of valuable nanoscale materials is hampered by energy intensive synthetic methods that require high temperatures (>300° C.) and environmentally harmful chemicals. It is currently understood that the unique electrical and optical properties that nanocrystals have are a direct result of their size and shape. For example, elongated structures like nanorods and nanowires conduct electrical currents more efficiently compared to more symmetrical shapes like nanospheres. In order for nanotechnology to reach its full potential, it is therefore necessary to develop synthetic strategies that provide strict control over the final nanocrystals shape/size while operating at lower synthetic temperatures and use less toxic chemicals. The present synthetic method of solution-phase synthesis of metal chalcogenide nanocrystals using organodichalcogenide reagents provides an answer to these problems of synthetic difficulty.

Metal chalcogenide nanocrystals are one family of semiconductors that are potentially useful for biological imaging, flat-screen/touch-screen panels, chemical sensors, photovoltaics, thermoelectrics, etc. Currently, in order to incorporate the chalcogen (oxygen, O; sulfur, S; selenium, Se; tellurium, Te) energy-intensive synthetic techniques must be used such as vacuum deposition or laser ablation. Some solution-phase techniques, whereby the chemical precursors are mixed in solution to make the nanocrystal product, are more feasible for industrial scalability, but require high temperatures (>300° C.) for them to operate successfully.

Conventionally, organophosphine chalcogenides are employed as the chalcogenide source; however, because of the relative stability of the phosphorous-chalcogen bond, high temperatures are required for chalcogen transfer (Bawendi et al. *J. Am. Chem. Soc.* 2006, 128, 13032; Alivisatos et al. *J. Am. Chem. Soc.* 2007, 129, 305). Pettenkofer et al. *Thin Solid Films* 2005, 480, 347 discloses the use of a organodichalcogenide (di-tert-butyl disulfide) to make a metal chalcogenide (copper indium sulfide, $CuInS_2$), but high vacuum techniques and molecular beams operating up to 1200° C. were used to create large (greater than nanoscale) $CuInS_2$ films that contained impurities such as $Cu_2S$ and $Cu_2In$. Elemental chalcogenides, another common source of S, Se, or Te, also require high temperatures for metal chalcogenide nanocrystal formation because of kinetic issues of dissolution. In addition, it currently remains difficult to control the ultimate shape and size of the final metal chalcogenides nanocrystals. These current drawbacks cause the synthesis of metal chalcogenide nanocrystals to be an expensive procedure that would ultimately increase the cost for the consumer in mass-produced technologies.

SUMMARY

This disclosure identifies a method to use organodichalcogenides in solution-phase at temperatures below their decomposition point to form metal chalcogenide nanocrystals.

In an embodiment of the present disclosure, the method of synthesizing metal chalcogenide nanocrystals comprises the steps of combining an organodichalcogenide, a metal salt and a compound containing a ligand to form a mixture; degassing the mixture to remove air and water from the mixture; and heating the mixture at a temperature below the decomposition temperature of the organodichalcogenide for a period of time sufficient to form a metal chalcogenide nanocrystal.

In another embodiment of the present disclosure, the method involves combining an organodichalcogenide, a compound containing a ligand, and a surfactant to form a mixture; degassing the mixture to remove air from the mixture; adding deaerated water to the mixture to form an aqueous mixture; and exposing the aqueous mixture to an ultraviolet lightsource for a period of time sufficient to form chalcogenide nanocrystals. Optionally, a metal salt is added to the mixture before addition of the deaerated water.

The organodichalcogenides are able to release the chalcogen by reacting with the reaction solvent or metal. In contrast to commonly used methods, the present disclosure produces the metal chalcogenides at far lower temperatures with limited unwanted byproducts. The present disclosure therefore improves upon the current methodology by (1) lowering synthesis temperature, (2) eliminating the need for specialized equipment (i.e. high-vacuum pumps, furnaces, or lasers), (3) eliminating the need for environmentally caustic chemicals, and (4) providing control over the size/shape of the final metal chalcogenide nanocrystal product.

Additional advantages and other features of the present disclosure will be set forth in part in the description which follows and in part will become apparent to those having ordinary skill in the art upon examination of the following or may be learned from the practice of the disclosure. The advantages of the disclosure may be realized and obtained as particularly pointed out in the appended claims.

As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

FIG. 1 is a powder XRD pattern of cubic $\beta$-$In_2S_3$ nanorods produced according to one embodiment of the present disclosure.

FIGS. 2a-d are high resolution XPS spectra of the nanorods of FIG. 1.

FIGS. 4a-c are room temperature photoluminescence spectra of (a) the nanorods of FIG. 1, ($\lambda_{ex}$=275 nm), (b) di-tert-butyl disulfide ($\lambda_{ex}$=372 nm), and (c) oleylamine ($\lambda_{ex}$=370 nm).

DETAILED DESCRIPTION OF ILLUSTRATIVE EMBODIMENTS

Figure 3:
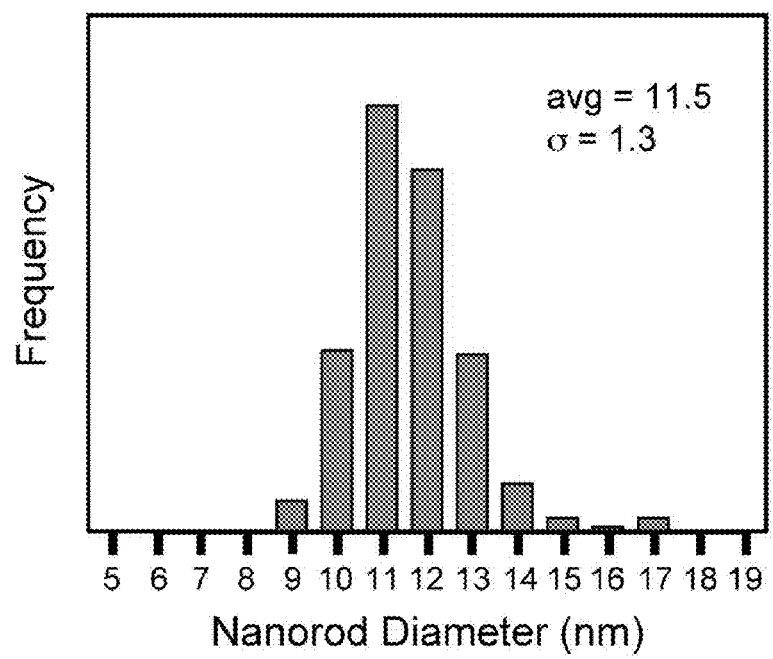
FIG. 3 is a transmission electron microscopy spectra showing size distribution of the nanorods of FIG. 1.

The described method of synthesizing metal chalcogenide nanocrystals comprises the steps of combining an organodichalcogenide, a metal salt and a compound containing a ligand to form a mixture; degassing the mixture to remove air and water from the mixture; and heating the mixture at a temperature below the decomposition temperature of the organodichalcogenide for a period of time sufficient to form a metal chalcogenide nanocrystal.

Organodichalcogenides are compounds that contain organic groups bound to chalcogens, or chalcogenide atoms, which are elements shown in group VIa of the periodic table: oxygen (O), sulfur (S), selenium (Se) and tellurium (Te). Examples of organodichalcogenides used in certain embodiments of the present disclosure are dialkyl or diaryl dichalcogenides of the formula $R_2E_2$, where R is at least one selected from the group consisting of alkyl or aryl and comprises from 1 to 30 carbon atoms, and E is at least one selected from the group consisting of O, S, Se or Te.

Also used in the synthesis are metal salts. In certain embodiments, the metal salt has a formula MXn, where M is a Group II-VI metal, X is at least one selected from the group consisting of alkoxide, halide, carboxylate, amide, or acetylacetonate, and n is from 1-6.

In other embodiments, the ligand compound doubles as the reaction solvent. This eliminates the need for high-boiling saturated hydrocarbons. Exemplary ligand compounds contain long-chain alkyl or aryl groups, and are organically-derived, primary amines, such as oleylamine. Optionally, long-chain carboxylic acids (i.e., lauric acid) or long-chain thiols (1-dodecanethiol) are also incorporated, when needed, to provide control over the final nanocrystal shape and size. For example, the ligand compound is any alkyl or aryl group of from 2 to 30 carbon atoms containing at least one selected from the group of amines, thiols, alcohols, carboxylic acids, phosphine oxides, or phosphonic acids.

In some embodiments, stoichiometric quantities of the ligand compound are used. Using stoichiometric quantities of the ligand compound increases the concentration of metal precursor in solution. This may result in an increase of the rate of growth and favor the formation of anisotropic nanostructures. Moreover, the use of stoichiometric quantities of reactants provides for less waste and subsequent removal of unreacted starting materials, which lowers the cost of the reaction.

The reaction conditions of the synthesis play an important role in producing the desired nanocrystal product. As a general rule, all reagents along with a magnetic stir bar are added under dry conditions. For example, a dry three-neck round-bottom flask fitted with a reflux condenser on one neck, glass stopper on the second neck, and a rubber septum on the third is used as the reaction vessel. This apparatus is assembled when hot and under flowing nitrogen to prevent water from being introduced. However, in other embodiments, the reaction uses aqueous conditions, but the reaction mixture is deaerated to prevent oxygen from adversely affecting the reaction.

Before the introduction of the organodichalcogenide, the reaction apparatus containing the metal precursor and solvent-surfactants is heated to 95° C. under nitrogen and cycled three times with vacuum. This process eliminates water from the reaction solution that may react with the metal to form unwanted by-products or prematurely decompose the organodichalcogenide. The temperature may range from about 80° C. to about 110° C., depending on the amount of adventitious water in the reaction mixture.

In some embodiments, after purging the system of water and/or air, stoichiometric quantities of organodichalcogenide are injected into the reaction solution via a syringe through the rubber septum. If the organodichalcogenide is a solid, the rubber septum is removed and the organodichalcogenide is poured in under a strong flow of nitrogen. Care is taken to prevent the addition of moisture into the reaction vessel during the addition of the organodichalcogenide. A concentrated solution of the organodichalcogenide may be added as well.

The reaction solution is heated to a temperature below the decomposition temperature of the organodichalcogenide. This allows for a kinetically controlled formation of the nanocrystals in solution. Optionally, the temperature is increased slowly and steadily (i.e., 10° C. $min^{-1}$). In certain embodiments, the temperature at which the reaction mixture is heated is at least 120° C. The period of time of the reaction is from about 3 minutes to about 7 hours. This reaction time can be longer compared to commonly used techniques which typically reach comparable nanocrystal sizes within several minutes. However, while slower than commonly used techniques, the present disclosure is a convenient method of size selection based on time rather than the often more complex variable space used to control size (i.e., concentration and surfactant stoichiometry).

Another embodiment of the present disclosure is a method of synthesizing metal chalcogenide nanocrystals in which photolysis is used to generate the metal chalcogenide nanocrystals. In this embodiment, the method comprises the steps of combining an organodichalcogenide, a ligand compound, and a surfactant to form a mixture; degassing the mixture to remove substantially all air from the mixture; adding deaerated water to the mixture to form an aqueous mixture; and exposing the aqueous mixture to an ultraviolet light source for a period of time sufficient to form chalcogenide nanocrystals.

In this embodiment, a metal salt is optionally added to the mixture before exposing the mixture to the ultraviolet light source. As in the above embodiment, the metal salt has a formula MXn, where M is a Group II-VI metal, X is at least one selected from the group consisting of alkyl, aryl, alkoxide, halide, carboxylate, amide, or acetylacetonate, and n is from 1 to 6. The ligand contains an alkyl group of from 2 to 30 carbon atoms and at least one selected from the group of amines, thiols, alcohols, carboxylic acids, phosphine oxides, or phosphonic acids.

In other embodiments, the synthetic method to form the metal chalcogenide nanocrystals uses a peroxide to expedite the reaction. During the reaction, the peroxide quickly decomposes followed by a slower decomposition of the metal salt. In one embodiment, anhydrous, solution-phase synthesis of metal chalcogenide nanocrystals is accomplished by the addition of thermally reactive oxygen-containing species (i.e., organic peroxides), which promote oxide nanocrystal formation at temperatures governed by the decomposition temperature of the organic peroxide which is well under the thermal decomposition temperature of the metal salt precursor. As such, addition and decomposition of the organic peroxide allows nanocrystal nucleation and growth to occur at lower temperatures than the aforementioned conventional methods.

In all methods, the reaction shows completion when crystalline matter is present in the reaction solution. Commonly known methods of purification to obtain the nanocrystals are employed. Examples of purification techniques include fractional crystallization, precipitation, filtration and the like.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the disclosure. However, it should be recognized that the present disclosure can be practiced without resorting to the details specifically set forth. In other instances, well known processing structures have not been described in detail, in order not to unnecessarily obscure the present disclosure.

Only a few examples of the present disclosure are shown and described herein. It is to be understood that the disclosure is capable of use in various other combinations and environments and is capable of changes or modifications within the scope of the inventive concepts as expressed herein.

EXAMPLES

The present method applies to the synthesis in the solution-phase for the fabrication of nanoscale (<100 nm) binary and ternary metal chalcogenides. Below are exemplary descriptions according to application/principles of a technique according to certain embodiments of the present disclosure:

Example #1

$IN_2S_3$ Nanocrystal Synthesis

All reagents were purchased from commercial sources and used without further purification. Indium (III) acetylacetonate (0.29 g, 0.71 mmol) and oleylamine (2.71 g, 10.13 mmol) were added to a three-neck round-bottom flask equipped with a reflux condenser, glass stopper, rubber septum, and stir bar. The reaction system was cycled between nitrogen and vacuum several times prior to heating to 95° C. (10° C. min$^{-1}$). At 95° C., the system was again cycled between nitrogen and vacuum several times to eliminate adventitious water. Di-tert-butyl disulfide (0.37 g, 2.1 mmol) was injected into the flask under flowing nitrogen, followed by heating (10° C. min$^{-1}$) to 180° C. After 7 hours, the reaction mixture was slowly cooled to room temperature. After dissolving the crude material in a minimal volume of dichloromethane, ethanol (ca. 15 mL) was added followed by sonication and centrifugation (6000 rpm for 15 min) to isolate the material. The yellow-orange solid was redissolved in a minimal volume of toluene and again precipitated with ethanol to produce a yellow-orange solid that forms stable suspensions in organic solvents such as hexane and toluene that are stable for several weeks.

Structural Characterization. Powder X-ray diffraction (XRD) analyses were performed on a Rigaku Rotaflex RTP 300 X-ray diffractometer using Cu Kα radiation ($\lambda$=1.54 Å). As shown in FIG. 1, the XRD analysis confirms the presence of the product. X-ray photoelectron spectra (XPS) were acquired on a VG Escalab II instrument using a monochromated aluminum anode (see, FIG. 2). The binding energy of aliphatic C 1 is in all spectra was standardized to 285.0 eV. For both XRD and XPS analysis, suspensions of the nanorods in toluene were deposited on glass substrates and dried in air at room temperature. Transmission electron microscopy (TEM) was performed on a JEOL 1011 microscope. Samples for TEM were prepared from dilute purified samples of the nanorods dissolved in toluene and deposited on 300 mesh carbon-coated copper grids (Ted Pella, Inc.). The length and diameter of approximately 300 nanorods were counted to determine the size distributions. As shown in FIG. 3, the size distribution is narrowly defined.

Electronic Characterization. Samples of nanorods were suspended in hexanes in a quartz cell. UV-Vis spectra were acquired on a Cary 14 spectrophotometer. The fluorescence spectrum of the same sample was found using a Jobin Yvon Fluorolog FL-3-222 Tau fluorimeter at an excitation wavelength of 367 nm (see, FIG. 4).

Figure 5:
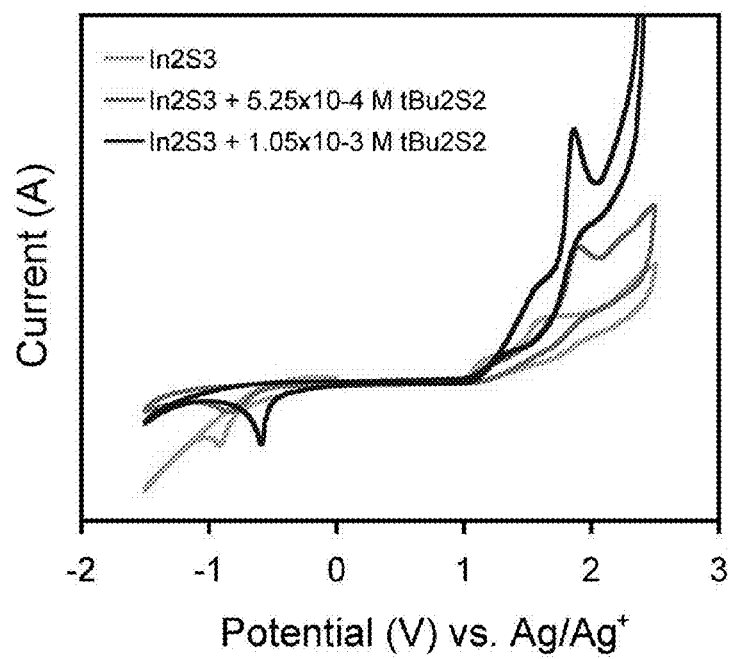
FIG. 5 shows CV curves of the $In_2S_3$ nanorods of FIG. 1 with increasing concentrations of di-tert-butyl disulfide.

CV curves were acquired on a Princeton Applied Research Potentiostat/Galvometer Model 283. The tetra-n-butylammonium hexafluorophosphate (TBAPF$_6$; 98%; Alfa-Aesar) electrolyte (0.3 M in dry, deoxygenated acetonitrile) was added to a dry three-neck round bottom flask equipped with three rubber septa. Glassy carbon, Pt, and Ag/Ag$^+$ electrodes were inserted into the solution via the rubber septa and served as the working, counter, and reference electrodes, respectively. Samples of nanorods were dried in the presence of excess electrolyte on the surface of the carbon electrode to form a thin yellow-orange film that adheres to the surface when submerged in the acetonitrile. For experiments with added di-tert-butyl disulfide, 1 or 2 μL di-tert-butyl disulfide were injected into the cell to give $5.25\times10^{-4}$ M or $1.05\times10^{-3}$ M solutions of the disulfide in acetonitrile, respectively. All other experimental conditions were constant. CV curves were acquired under an inert atmosphere at a scan rate of 10 mV s$^{-1}$ and are shown in FIG. 5.

Example #2

Photolytic Preparation of TE Nanorods $^t$Bu$_2$Te$_2$ (50.0 mg, 0.135 mmol), dodecanethiol (0.10 mL), and polyoxyethylene(12) tridecyl ether (5.0 mL) were stirred in a Schlenk flask and degassed by cycling between nitrogen and vacuum 3 times. Deaerated water (50 mL) was added with vigorous stirring to produce an optically transparent, light yellow solution that was cannula transferred into a nitrogen-filled quartz flask. The flask was sealed under nitrogen and subjected to photolysis at 254 nm (Luzchem ICH-2 photoreactor, 4/16 low-pressure 8 W Hg lamps were used) for 12 h with stirring to yield a dark brown suspension of the Te nanorods. Purification of the nanorods was accomplished by precipitation with acetone (acetone:water=5:1 vol/vol) followed by centrifugation (6000 rpm, 15 min). The freshly purified nanorods can be easily redispersed in water with gentle agitation.

Example 3

Peroxide Facilitated Synthesis of Indium Oxide Nanocrystals

General Considerations

Indium(III) acetylacetonate (99.99%; Strem Chemicals), lauric acid (dodecanoic acid; 99%; MP Biomedicals), oleylamine (cis-9-octadecenylamine; TCI America), benzoyl peroxide (97%; Sigma-Aldrich), di-tert-butyl peroxide (98%; Sigma-Aldrich), and lauroyl peroxide (didodecanoyl peroxide; 97%; Sigma-Aldrich), were all purchased and used without further purification. Nanocrystal syntheses were performed under nitrogen, in the absence of water, using standard Schlenk techniques.

Synthesis of In$_2$O$_3$ Nanocrystals. In a typical synthesis, In(acac)$_3$ (0.30 g, 0.73 mmol), lauric acid (0.58 g, 2.91 mmol), and oleylamine (2.32 g, 8.66 mmol) were added to a three-neck round bottom flask fitted with a reflux condenser, glass stopper, and rubber septum. Prior to heating, the system was cycled three times with vacuum and nitrogen to eliminate adventitious water. The mixture was heated (10° C. min$^{-1}$) to 95° C. and vacuum was again applied. Di-tert-butyl peroxide (4.0 mL, 2.18 mmol) was quickly injected into the system under flowing nitrogen, and the temperature was increased (10° C. min$^{-1}$) to 180° C. and allowed to react for 330 min with stirring. After cooling to room temperature, the reaction mixture was dissolved in 2 mL of dichloromethane; then 15 mL of ethanol was added and the mixture was sonicated and centrifuged (4000 rpm for 15 min) to yield a white solid. Precipitation was repeated with toluene (0.5 mL) and ethanol (15 mL) to yield the purified product. When benzoyl peroxide (0.26 g, 2.16 mmol) or lauroyl peroxide (0.86 g, 2.16 mmol) were used, the oxidants were funneled into the reaction mixture at 95° C. under flowing nitrogen, followed by application of vacuum. The resulting $In_2O_3$ nanocrystals form suspensions in organic solvents such as hexane, toluene, and benzene that are stable for several weeks.

The invention claimed is:

1. A method of synthesizing metal chalcogenide nanocrystals comprising the steps of:
   combining an organodichalcogenide, a metal salt and a ligand compound to form a mixture;
   degassing the mixture to remove air and water from the mixture; and
   heating the mixture at a temperature below the decomposition temperature of the organodichalcogenide for a period of time sufficient to form a metal chalcogenide nanocrystal.

2. The method of claim 1, wherein the organodichalcogenide is of the formula $R_2E_2$, where R is at least one selected from the group consisting of alkyl or aryl and comprises from 1 to 30 carbon atoms, and E is at least one selected from the group consisting of O, S, Se or Te.

3. The method of claim 1, wherein during the degassing step, the mixture is heated to a temperature of about 80° C. to about 110° C.

4. The method of claim 1, wherein the metal salt is a Group II-VI metal.

5. The method of claim 1, wherein the metal salt has a formula MXn, where M is a Group II-VI metal, X is at least one selected from the group consisting of alkyl, aryl, alkoxide, halide, carboxylate, amide, or acetylacetonate, and n is from 1-6.

6. The method of claim 1, wherein the ligand compound contains an alkyl group of from 2 to 30 carbon atoms and at least one selected from the group of amines, thiols, alcohols, carboxylic acids, phosphine oxides, or phosphonic acids.

7. The method of claim 1, wherein the heating temperature is 120° C. or greater.

8. The method of claim 1, wherein the period of time is from about 3 minutes to about 7 hours.

9. A method of synthesizing metal chalcogenide nanocrystals comprising the steps of:
   combining an organodichalcogenide, a ligand compound, and a surfactant to form a mixture;
   degassing the mixture to remove air from the mixture;
   adding deaerated water to the mixture to form an aqueous mixture; and
   exposing the aqueous mixture to an ultraviolet light source for a period of time sufficient to form chalcogenide nanocrystals.

10. The method of claim 9, wherein a metal salt is added to the mixture before exposing the mixture to the ultraviolet light source.

11. The method of claim 10, wherein the metal salt has a formula MXn, where M is a Group II-VI metal, X is at least one selected from the group consisting of alkyl, aryl, alkoxide, halide, carboxylate, amide, or acetylacetonate, and n is from 1 to 6.

12. The method of claim 9, wherein the ligand contains an alkyl group of from 2 to 30 carbon atoms and at least one selected from the group of amines, thiols, alcohols, carboxylic acids, phosphine oxides, or phosphonic acids.

13. The method of claim 9, wherein the period of time is from about 3 minutes to about 7 hours.

14. The method of claim 1, wherein the organodichalcogenide and the ligand compound are added in stiochiometric amounts.

15. The method of claim 9, wherein the organodichalcogenide and the ligand compound are added in stiochiometric amounts.

* * * * *